Dec. 4, 1956  R. A. GILBERT  2,772,575
INFINITELY VARIABLE RATIO TRANSMISSION MECHANISM
Filed April 18, 1955  3 Sheets-Sheet 1

INVENTOR
RONALD A. GILBERT
BY
ATTORNEY

Dec. 4, 1956  R. A. GILBERT  2,772,575
INFINITELY VARIABLE RATIO TRANSMISSION MECHANISM
Filed April 18, 1955  3 Sheets-Sheet 2

INVENTOR
RONALD A. GILBERT
BY Watson, Cole, Grindle & Watson
ATTORNEY

Dec. 4, 1956 R. A. GILBERT 2,772,575
INFINITELY VARIABLE RATIO TRANSMISSION MECHANISM
Filed April 18, 1955 3 Sheets-Sheet 3

INVENTOR
RONALD A. GILBERT
BY Watson, Cole, Grindle & Watson
ATTORNEY

United States Patent Office 2,772,575
Patented Dec. 4, 1956

2,772,575

INFINITELY VARIABLE RATIO TRANSMISSION MECHANISM

Ronald Albert Gilbert, North Wembley, England, assignor to D. Napier & Son Limited, London, England, a British company Application April 18, 1955, Serial No. 502,124

Claims priority, application Great Britain April 26, 1954

2 Claims. (Cl. 74—199)

This invention relates to infinitely variable ratio transmission mechanism of the kind comprising a shaft on which are mounted, so as to be capable of moving axially but not rotating thereon, a number of spaced discs the opposite faces of each of which lie on opposite sides of a plane normal to the axis of the shaft and progressively approach that plane from their inner to their outer circumferential portions, as by being of wide angle frusto-conical form, and at least one other shaft having its axis parallel to that of the first shaft and carrying discs having thickened circumferential edge portions constituting rib-like parts which lie between and make driving engagement with the discs on the first shaft, resilient means tending always to press the discs on one shaft (hereinafter for convenience called the main shaft) axially towards one another and therefore into close driving engagement with the discs on the other shaft (hereinafter for convenience called a layshaft), and means for moving the shafts toward and away from one another so as to vary the transmission ratio as between them.

Usually a set of discs of one of the two forms referred to is mounted on the main shaft and will be engaged by two or more sets of discs of the other form mounted respectively on two or more layshafts evenly angularly spaced about the axis of the main shaft and arranged to be simultaneously and similarly moved towards and away from the axis of the main shaft so that the ratio of transmission between the main shaft and each of the layshafts is the same at any moment. In such transmission gearing, of which a typical example is described in the specification of British Patent No. 671,561, the layshafts are connected by transmission gearing to a common shaft coaxial with the main shaft so that the two coaxial shafts constitute in effect the input and output shafts of the transmission mechanism as a whole.

In transmission mechanism of the general kind referred to as hitherto proposed the effective force of the resilient means automatically becomes less with movement of the layshafts or layshafts away from the axis of the main shaft since the discs on the main shaft are then permitted to move towards one another, and vice versa.

According to the present invention an infinitely variable ratio transmission mechanism of the kind referred to includes in combination with the resilient means for maintaining the transmission discs in driving engagement, apparatus arranged to be operated simultaneously with the control mechanism for moving the main and layshafts towards and away from one another to vary the effective transmission ratio of the transmission mechanism and acting on the resilient means in such manner as to modify or control in some desired manner the force exerted by the resilient means on the disc or discs when such discs are moved under the action of the resilient means or against such action.

The apparatus acting on the resilient means and operated simultaneously with the control mechanism for varying the effective transmission ratio may be so arranged as to tend to maintain the force exerted by the resilient means on the discs substantially constant over the whole range of transmission ratios or so as to cause the force exerted by the resilient means on the discs to vary in accordance with some predetermined law, and in the latter case would usually serve to reduce the variations in the force exerted by the resilient means on the discs which would occur if the apparatus controlling the resilient means were not present.

The resilient means will usually be in the form of a spring or springs acting on the discs on the main shaft to maintain them in driving engagement with the discs on the layshaft or layshafts, in which case the apparatus for controlling the effective force exerted by the spring or springs on the discs will comprise a movable abutment for the end or ends of the spring or springs remote from the discs. In this case an operative connection is provided between the control mechanism for varying the transmission ratio and the abutment by which the abutment is moved in the required sense with changes in the gear ratio. Thus in one convenient example, in which the resilient means comprises one or more helical compression springs arranged coaxially with the main shaft and acting at one end upon the discs thereon and at the other end upon a movable abutment arranged coaxially with the spring or springs, the abutment may be arranged to rock through a predetermined angle about the axis of the spring or springs and be so connected to the control mechanism for varying the transmission ratio as to be so rocked by movement of such control mechanism, means being provided whereby the abutment is caused to move axially when so rocked. These latter means might comprise, for example, quick-pitch screwthread mechanism or cam and follower mechanism.

One construction according to the invention is illustrated by way of example and to some extent diagrammatically in the accompanying drawings, in which.

The variable ratio transmission mechanism shown in the accompanying drawings comprises a casing A in which is carried in suitable bearings a main shaft B on which are mounted, so that they can slide axially thereon but not rotate relatively thereto, a series of spaced discs $B^1$ each so formed as to provide adjacent to its edge a rim portion which has slightly greater thickness than the adjacent portions. Pivotally supported within the casing A on axes $C^1$ which are equally circumferentially spaced around the axis of the main shaft B and parallel to this axis are three carriers C each having mounted therein upon an axis $C^2$ parallel to but displaced from the associated pivotal axis $C^1$, a rotatable layshaft $C^3$ on which are mounted, so as to slide but not rotate relatively thereto, a series of discs D which have wide angle frusto-conical faces. The discs D extend into the spaces between the discs $B^1$ to make driving engagement with the rim portions thereof all in a manner well-known in variable ratio transmission mechanism of the kind in question. Each of the layshafts $C^3$ is connected by similar gearing (not shown), including a gear wheel coaxial with the pivotal axis $C^1$ of its carrier C, to a common shaft (also not shown) coaxial with the main shaft B so that the main shaft and the common shaft referred to constitute in effect main input and output shafts. As so far described the transmission gearing is of well-known type and no more detailed description thereof is therefore given.

Figure 3:
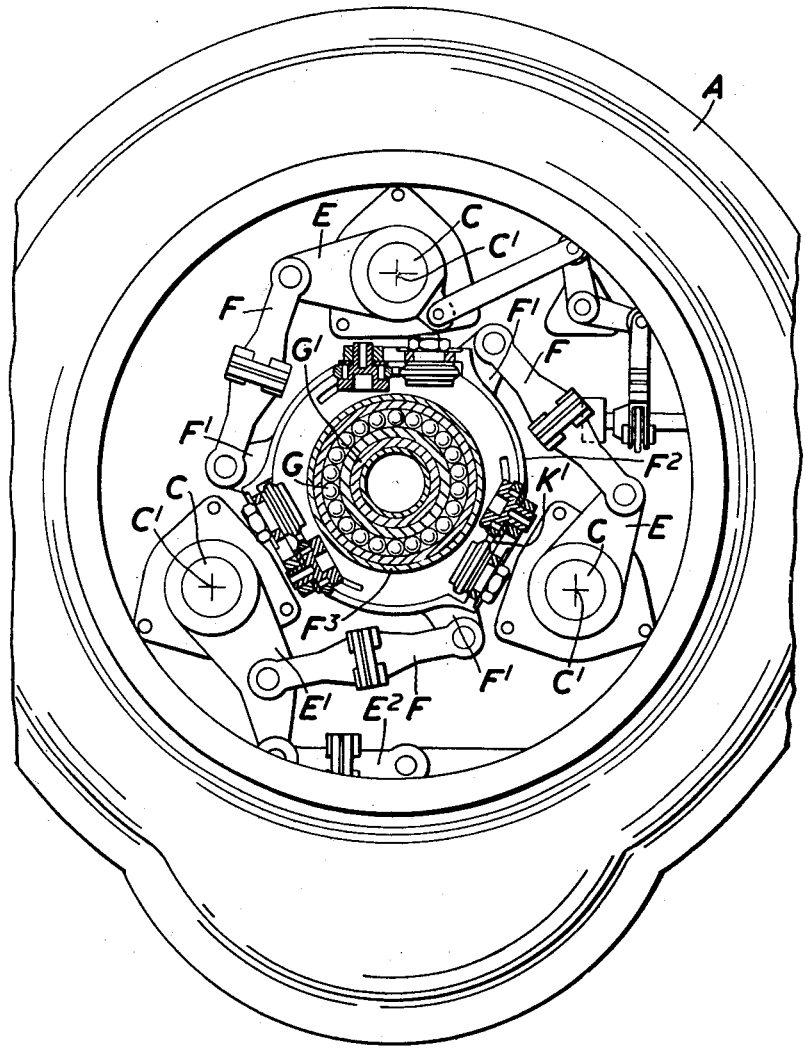
Figure 3 is an end elevation partly in cross-section in the plane 3—3 of Figure 1, and Figures 4 and 5 are small views showing the operation of cam and roller mechanism embodied in the construction shown.

Two of the carriers C have rigidly connected to them at one end arms E while the third carrier has rigidly connected to the same end thereof an arm $E^1$ as shown most clearly in Figure 3, the arms E and $E^1$ as shown extending radially with respect to the axes $C^1$. The three arms, E, E, $E^1$ are connected by links F to lugs $F^1$ on a ring $F^2$ which is mounted in the casing A so as to be capable of rocking about the axis of the main shaft B and has at one end an internal flange $F^3$ which bears on the outer race of a thrust bearing G the inner race of which is mounted on a sleeve $G^1$ rigid with the shaft B. The arrangement is thus such that when movement is imparted to the arm $E^1$, as by means of a control member indicated at $E^2$, this causes rocking of the ring $F^2$ and hence pivotal movement of each of the arms E corresponding exactly to the pivotal movement of the arm $E^1$. By operation of the member $E^2$, therefore, the three carriers C can be caused to rock simultaneously and similarly so as to move the discs D inwards and outwards in relation to the axis of the shaft B to vary the gear ratio of the transmission mechanism in well-known manner.

The discs $B^1$ lie axially between a rigid plate $B^2$ secured to the shaft B and a second rigid plate $B^3$ which is capable of sliding on the shaft B but not rotating thereon and is acted upon by the inner race H of a thrust bearing $H^1$. The outer race $H^2$ of the bearing $H^1$ is acted upon through a thrust member $H^3$ by an abutment member J at one end of a multiple spring assembly comprising three helical springs generally indicated at $J^1$. The other end of the spring assembly $J^1$ acts upon an abutment K which is mounted so that it can move in a direction parallel to the axis of the shaft B for the purpose of maintaining a desired degree of compression in the spring assembly. The abutment K is in the form of a ring from which project in a direction away from the spring assembly $J^1$ three V-shaped cam members $K^1$ extending through slots in the flange $F^3$.

Figure 1:
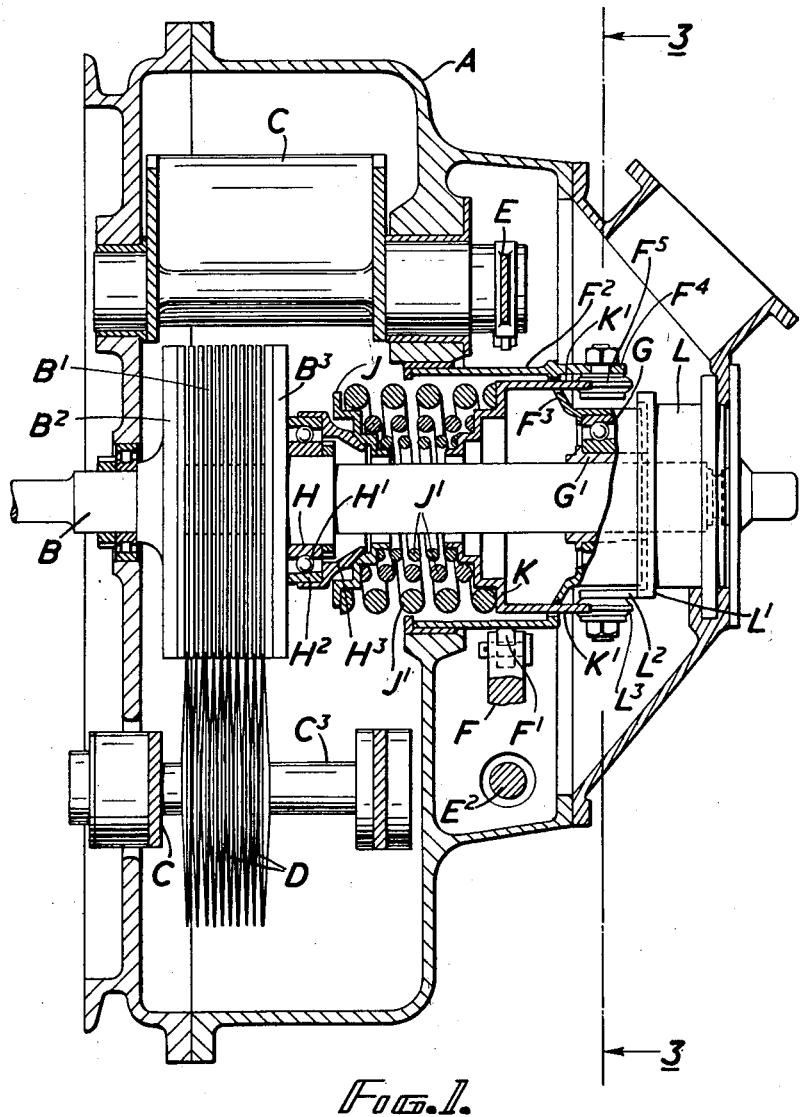
Figure 1 is a sectional side elevation of the transmission mechanism.
Figure 2:
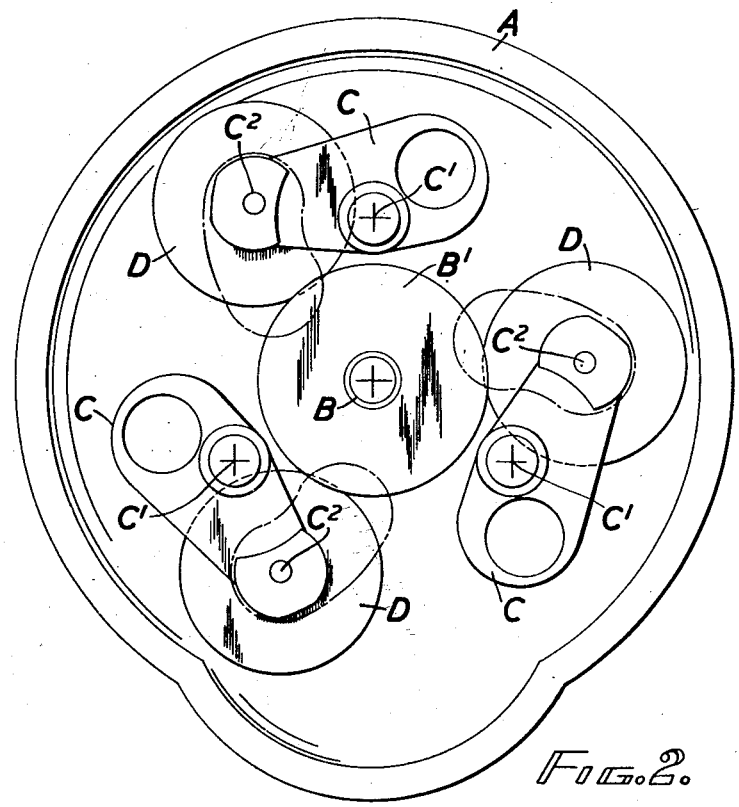
Figure 2 is a somewhat diagrammatic end view showing the general arrangement of the discs and the manner in which they move to vary the gear ratio.
Figure 4:
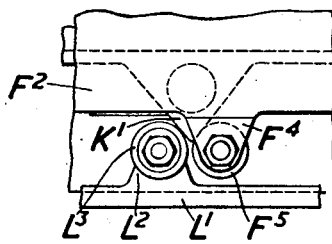
Figure 5:
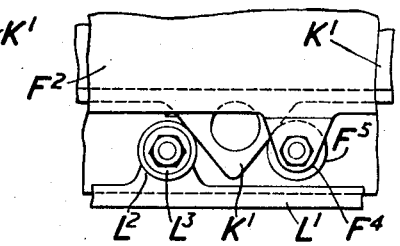

Mounted on a tubular member L rigid with the casing A is a ring $L^1$ from which project towards the ring $F^2$ three lugs $L^2$ carrying rollers $L^3$ arranged so as each to engage one side of one of the V-shaped cam members $K^1$ as shown most clearly in Figures 4 and 5. The ring $F^2$ is similarly provided with three lugs $F^4$ carrying rollers $F^5$ which engage the other sides of the V-shaped cam members $K^1$. The two sides of each V-shaped cam member $K^1$ are thus engaged respectively by a roller $L^3$ mounted upon a stationary axis and a roller $F^5$ mounted on the ring $F^2$ which is movable about the axis of the main shaft and is so moved with variations in the positions of the carriers C to vary the transmission ratio.

It will be apparent that the movement imparted to the ring $F^2$ and hence to the rollers $F^5$ will, by causing the rollers $F^5$ and $L^3$ to move towards and away from one another in the circumferential direction, cause axial movement of the abutment K and hence control the compression of the springs of the spring assembly $J^1$ in a manner related to the gear ratio being transmitted and in accordance with a law which can either be a substantially straight line law or some other law, depending upon the formation of the surfaces of the V-shaped cams $K^1$.

Thus in a typical example it is possible to ensure that, irrespective of the gear ratio being transmitted and hence of the degree of separation of the discs $B^1$ by reason of the entry between them of the discs D, the axial force exerted upon the discs $B^1$ by the spring assembly remains substantially constant. Alternatively the force exerted by the spring assembly upon the discs $B^1$ may be caused to vary in accordance with some predetermined law so that the pressure with which the discs $B^1$ are forced towards the discs D can always be approximately that which is appropriate to the gear ratio and/or to the power being transmitted.

In the above description constructional details, apart from those associated with the features in which the gear according to the invention differs from known gears, have been omitted for the sake of brevity.

What I claim as my invention and desire to secure by Letters Patent is:

1. An infinitely variable ratio transmission mechanism including in combination a main shaft, a series of transmission discs mounted to slide but not rotate on the main shaft, at least one lay shaft parallel to but displaced laterally from the main shaft, a series of transmission discs on the lay shaft and extending into the space between the discs on the main shaft, the surfaces of the discs on one of the said shafts being of generally frusto-conical form, and engaged by rim portions of the discs on the other of the said shafts, an abutment, resilient means tending to force the transmission discs on the main shaft toward one another, said resilient means comprising a helical spring assembly arranged coaxially with the discs on the main shaft and acting at one end upon such discs and at the other end upon said abutment, said abutment being arranged coaxially with the spring assembly, control mechanism for moving the main and lay shafts toward and away from one another to vary the effective transmission ratio of the transmission mechanism according to a predetermined law entirely independent of variations in the torque being transmitted, a control ring interconnected with the transmission mechanism and arranged coaxially with and capable of rocking about the axis of the spring assembly, cam means between the control ring and the adjacent spring abutment whereby such rocking movement of the control ring causes axial movement of the spring abutment to control the force exerted by the resilient means on the discs, as such discs move toward and away from one another.

2. An infinitely variable ratio transmission mechanism as claimed in claim 1, in which the cam mechanism comprises V-shaped cam members on the abutment of the spring assembly, and a fixed roller and a roller carried by the control ring arranged to engage the opposite sides of each V-shaped cam member whereby movement of the two rollers associated with each cam member towards and away from one another causes axial movement of the abutment.

References Cited in the file of this patent

UNITED STATES PATENTS

| 1,806,984 | Prout | May 26, 1931 |
| 2,586,260 | Rennerfelt | Feb. 19, 1952 |
| 2,623,396 | Beier | Dec. 30, 1952 |

FOREIGN PATENTS

| 257,792 | Great Britain | Sept. 9, 1926 |